United States Patent [19]
Boyce

[11] Patent Number: 5,165,169
[45] Date of Patent: Nov. 24, 1992

[54] BEARING SERVICING TOOL
[75] Inventor: Rex A. Boyce, Friendswood, Tex.
[73] Assignee: The United States of America as represented by the Administrator of the National Aeronautics and Space Administration, Washington, D.C.
[21] Appl. No.: 785,637
[22] Filed: Oct. 31, 1991
[51] Int. Cl.⁵ .......................................... B23P 19/00
[52] U.S. Cl. .............................. 29/898.08; 29/898.01; 29/898.07; 29/426.5; 29/263
[58] Field of Search ................ 29/244, 245, 256, 258, 29/259, 263, 264, 426.5, 525, 724, 898.01, 898.07, 898.08, 402.03, 402.08

[56] References Cited
U.S. PATENT DOCUMENTS

| | | | |
|---|---|---|---|
| 1,468,777 | 9/1923 | Edwards | 29/263 |
| 1,589,862 | 6/1926 | Quint | 29/263 |
| 1,736,529 | 11/1929 | Goeller | 29/263 |
| 2,287,767 | 6/1942 | Dodge | 29/85 |
| 3,110,958 | 11/1963 | McCord | 29/263 |
| 3,393,441 | 7/1968 | Gebhart | 29/256 |
| 4,437,220 | 3/1984 | Gregory | 29/426.5 |
| 4,509,241 | 4/1985 | Freeland et al. | 29/263 |
| 4,542,571 | 9/1985 | Sullivan | 29/256 |
| 4,624,040 | 11/1986 | Sabo | 29/258 |
| 4,624,041 | 11/1986 | Gathright et al. | 29/263 |
| 4,761,868 | 8/1988 | Allison | 29/256 |
| 5,025,542 | 6/1991 | Jacks | 29/263 X |

FOREIGN PATENT DOCUMENTS
932937 9/1973 Canada .
470110 8/1937 United Kingdom .

Primary Examiner—Mark Rosenbaum
Assistant Examiner—S. Thomas Hughes
Attorney, Agent, or Firm—Hardie R. Barr; Guy M. Miller; Edward K. Fein

[57] ABSTRACT

A tool for removing and/or replacing bearings in situ comprises a brace having a first end adapted to engage a first end of the bearing housing, and a second end adapted to engage a second end of the bearing housing. If the two ends of the bearing housing are different in configuration, the respective ends of the brace are correspondingly configured. An elongate guide member integral with the brace has two parts, each projecting endwise from a respective end of the brace. A pressure plate is alternatively removable mountable on either part of the guide member for longitudinal movement therealong, and has first and second ends of different configurations adapted to engage first and second ends respectively of the bearing. A threaded-type drive is cooperative between the guide and the pressure plate to move the pressure plate longitudinally along the guide and apply a force to the bearing, either to remove the bearing from its housing, or to emplace a new bearing in the housing.

10 Claims, 2 Drawing Sheets

BEARING SERVICING TOOL

ORIGIN OF THE INVENTION

The invention described herein was made by an employee of the United States government and may be manufactured and used by and for the government of the United States of America for governmental purposes without the payment of any royalties thereon or therefor.

BACKGROUND OF THE INVENTION

The present invention pertains to the servicing of rotary bearings, and more particularly to the removal of rotary bearings in which the outer race is press fit into a generally annular housing and/or to re-emplacement of a new bearing into such housing. Such servicing may be particularly difficult and time consuming if it is necessary, and also difficult, to remove the bearing housing from the apparatus in which it is normally employed and send that housing to a shop or the like. An example of a particularly difficult environment is in the horizontal tail control system of certain aircraft. An exemplary set of instructions for removing the bearing housing from such an aircraft portion comprises some nine pages of instructions and illustrations, and in practice, takes several hours to perform; this is before the actual process of removing the old bearing from the housing can even begin.

Furthermore, apparatus typically used for the actual bearing removal process is often expensive, bulky and/or dangerous, e.g. hydraulic or pneumatic equipment.

A number of prior art devices have been developed for attempting to provide smaller, simpler tools for removing bearings from their housing, and at least some of which might be used with the housing in situ in the apparatus, typically an automotive vehicle. These typically utilize a stationary member for taking purchase against the bearing housing and a movable member for pushing against the bearing proper, the members being interconnected by some type of screw thread drive. However, these have suffered from a variety of disadvantages.

U.S. Pat. No. 3,393,441 to Gebhart discloses a device which is only usable for forming or breaking a press fit of an inner bearing race with respect to a shaft. Furthermore, it utilizes a number of different separable parts, and different combinations of these parts must be used depending upon whether the apparatus is being used to emplace a new bearing or remove an old bearing. These parts can be lost or mislaid, and the manner of assembly for the different functions of the tools is relatively complicated.

U.S. Pat. No. 2,287,767 discloses a device which is only for emplacing a pair of axially spaced bearings, and which is designed to apply pressure only to the inner races of those bearings. The device cannot be used to remove bearings.

U.S. Pat. No. 4,437,220 to Gregory is specialized for use in a particular type of universal joint, and while fairly simple in and of itself, actually makes use of certain parts of the universal joint, so that it is not applicable to rotary bearings in general.

U.S. Pat. No. 4,624,040 to Sabo is even more complicated, in terms of the number of different parts, than the aforementioned patent to Gebhart, not only requiring different parts for removing and emplacing bearings, but also having further parts for removing and emplacing wheel hubs. The chance of dissemination of the parts and/or confusion by the operator is therefore increased.

U.S. Pat. No. 4,542,571 to Sullivan discloses a fairly simple device wherein the same parts, if rearranged, can be used for either emplacing or removing bearings. However, this device is not readily applicable to the types of bearings described above in connection with aircraft, wherein the opposite ends of the bearing housing are different in configuration, and wherein it is undesirable to apply pressure to both the inner and outer bearing races when pressing a new bearing into its housing.

SUMMARY OF THE INVENTION

The present invention addresses the above problems by providing a tool which can be used in situ either for removing or emplacing bearings, even bearings such as those of aircraft, which may have asymmetrical housings. Nevertheless, the tool is fairly simple, both in construction and operation, and includes relatively few separate parts. Furthermore, those few parts, when not in use, can be connected together in a simple manner which will prevent their dissemination or loss.

More specifically, apparatus in accord with one preferred embodiment of the invention comprises a bracing body having first and second ends adapted to engage first and second ends, respectively, of a bearing housing, in the alternative; that is to say, the first end of the bracing body may engage a first end of the bearing housing for bearing removal operation, and the bracing body can be repositioned so that its second end engages the second end of the bearing housing for use in installing a new bearing in the housing. An elongate guide member has first and second parts projecting endwise from the first and second ends, respectively, of the bracing body. A motive body is removably mountable on either of the two parts of the guide member, in the alternative, for longitudinal movement therealong. The motive body has first and second ends of different configurations adapted to engage first and second ends, respectively, of a bearing in, or to be emplaced within, the bearing housing. A force transmission means is cooperative between the guide member and the motive body to move the motive body longitudinally along the guide member and apply a force to the bearing.

Thus, in a bearing removal mode, after the central shaft which is normally supported by the bearing has been removed, but with the bearing housing still in situ, the first end of the bracing body can be placed in engagement with the first end of the bearing housing, with the first part of the guide member extending centrally through the bearing along its axis. The motive body is then installed on the first part of the guide member, with its first end facing the bearing, that first end being sized to fit within the adjacent (second) end of the bearing housing and to abut the bearing, preferably including abutment of the outer race of the bearing. The force transmission means, which may include threads on the guide member and on a drive nut emplaced on the drive member outwardly of the motive body, may then be used to move the motive body inwardly on the guide member, thereby forcing the bearing out of its housing.

In a bearing installation mode, the second end of the bracing body is placed in engagement with the second end of the bearing housing, with the second part of the guide member extending centrally through the bearing.

A new bearing is placed on the second end of the motive body, which is preferably adapted, by the provision of portions of different outer diameter, to carry the bearing. This subassembly is then placed on the guide member with the bearing and the second end of the motive body facing toward the bearing housing. The drive nut is once again emplaced on the guide member outwardly of the motive body and used to move that body inwardly on the guide member, thereby forcing the bearing carried thereby into its housing. Preferably, the second end of the motive body has an axial recess which clears the inner race of the bearing, so that the pressing force is applied only to the outer race of the bearing during the installation process.

The invention contemplates a number of other salient features which, in various embodiments of the invention, can be combined with the above features or used independently.

More particularly, the two ends of the bracing body may be of differing configurations so as to accommodate an asymmetrical bearing housing such as is often found in aircraft. Even more specifically, the first end of the bearing housing may have an annular axially outer surface which is inclined with respect to the bearing axis. The first end of the bracing body may be correspondingly inclined, and indicia marks may be provided on the bearing housing and the bracing body to aid in properly "mating" those inclined surfaces, i.e. abutting them in complementary relationship. The second ends of the bearing housing and bracing body may be of different configuration or orientation, e.g. perpendicular to the axis of the bearing and the tool (which are collinear in use).

Another such salient feature is that the guide member may be integrated with the bracing body, so as to reduce the number of separable parts, and thus the chances for dissemination and/or loss of parts of the apparatus.

Still other salient features of the invention, as well as various objects and advantages thereof, will be made apparent by the following detailed description, claims, and the drawings, wherein:

DETAILED DESCRIPTION OF THE INVENTION

An exemplary embodiment of the invention is illustrated in conjunction with a bearing of a type used in the horizontal tail control system of an aircraft, and the illustrated embodiment is particularly adapted for use with this type of bearing. It will be appreciated that the configuration of certain parts of the tool apparatus could be modified for use with bearings having different configurations, within the spirit of the present invention.

Figure 2:
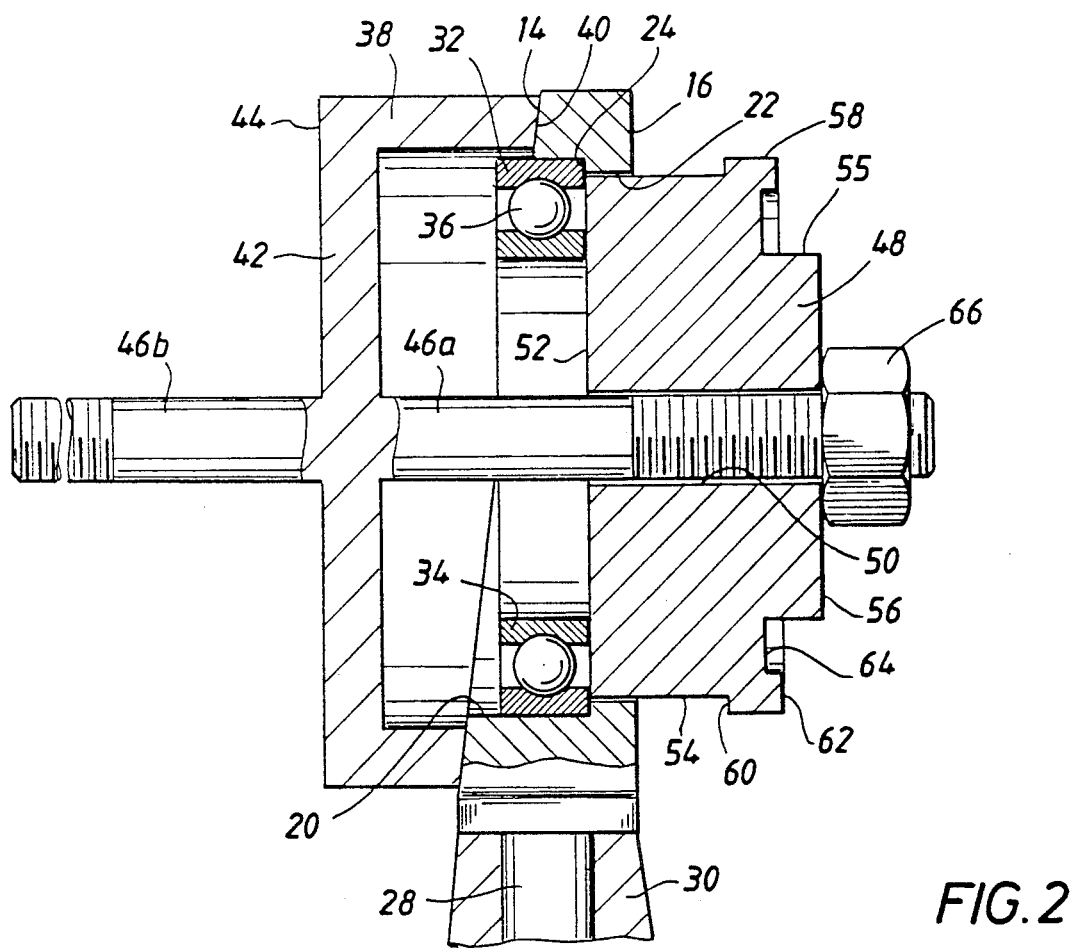
FIG. 2 is a longitudinal cross-sectional view, with some parts in elevation, of the apparatus in bearing removal mode, and also showing the bearing to which the apparatus is applied.
Figure 4:
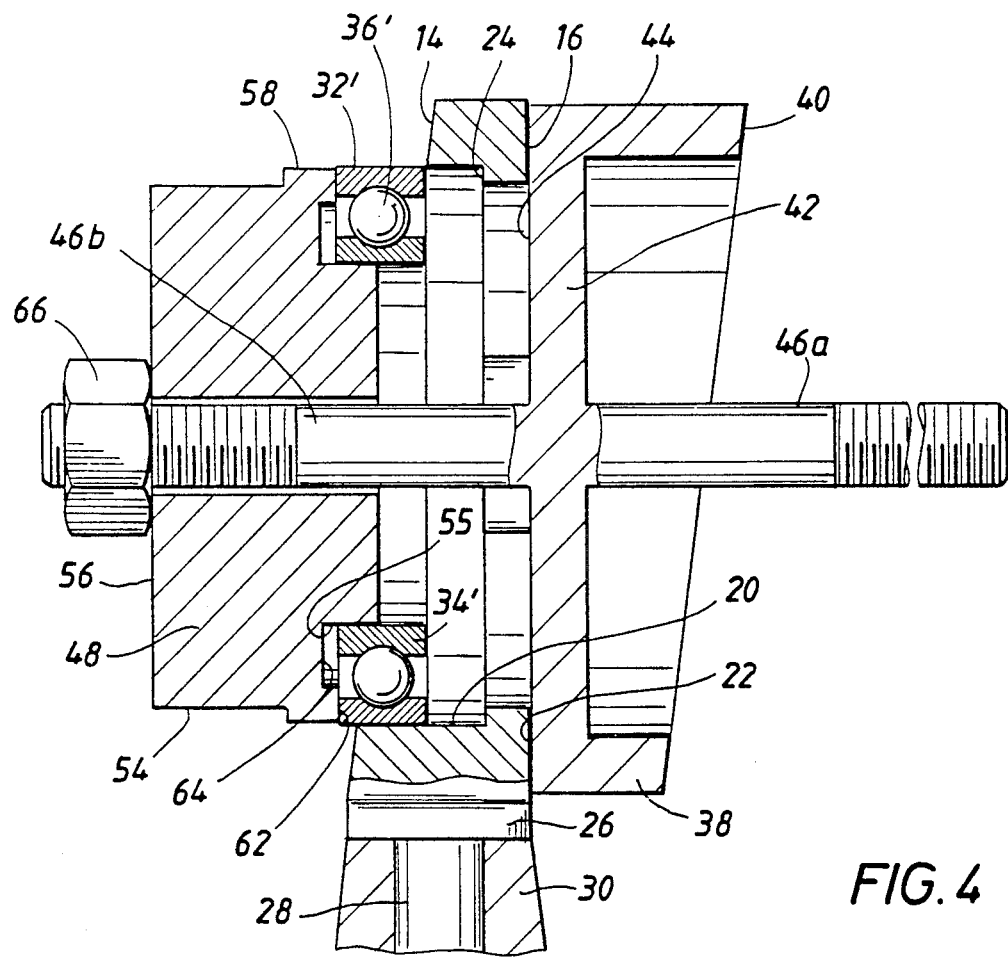
FIG. 4 is a view similar to that of FIG. 2, but showing the apparatus in bearing installation mode.

The bearing assembly includes an annular bearing housing 10 having the annular bearing proper 12 concentrically mounted therein. The bearing housing 10 has a first end with an annular axially outwardly facing surface 14 which is inclined with respect to the central axis of the bearing, as best seen in FIGS. 2 and 4. The other or second end of the bearing housing has an annular axially outer surface 16 which lies perpendicular to the bearing axis. Adjacent surface 16, the housing 10 includes a pair of diametrically opposed ears 18 which project radially into the interior of the bearing housing at its second end; ears 18 do not extend the full length of the bearing housing 10. The housing 10 has a relatively large inner diameter, as indicated at 20, at its first end, and a smaller inner diameter 22 at its second end, a shoulder 24 facing axially toward the first end thus being formed at the juncture between the large and small inner diameter parts 20 and 22. A base portion 26 is integrally formed on the housing 10 and extends radially outwardly therefrom, more specifically downwardly in use, as shown. A trunion-like pin 28 integral with and extending further outwardly from base 26 is adapted for disposition in a bore of a bearing support member 30 in the aircraft.

The bearing proper includes an outer race 32 press fitted into the large diameter part 20 of the housing 10 and in abutment with the shoulder 24, an inner race 34, which, in use, engages and rotates with a shaft (not shown) supported by the bearing 12. The races 32 and 34 are spaced apart, and have opposed surfaces configured to capture a set of anti-friction elements, in this case balls 36, which complete the bearing subassembly 12.

Figure 1:
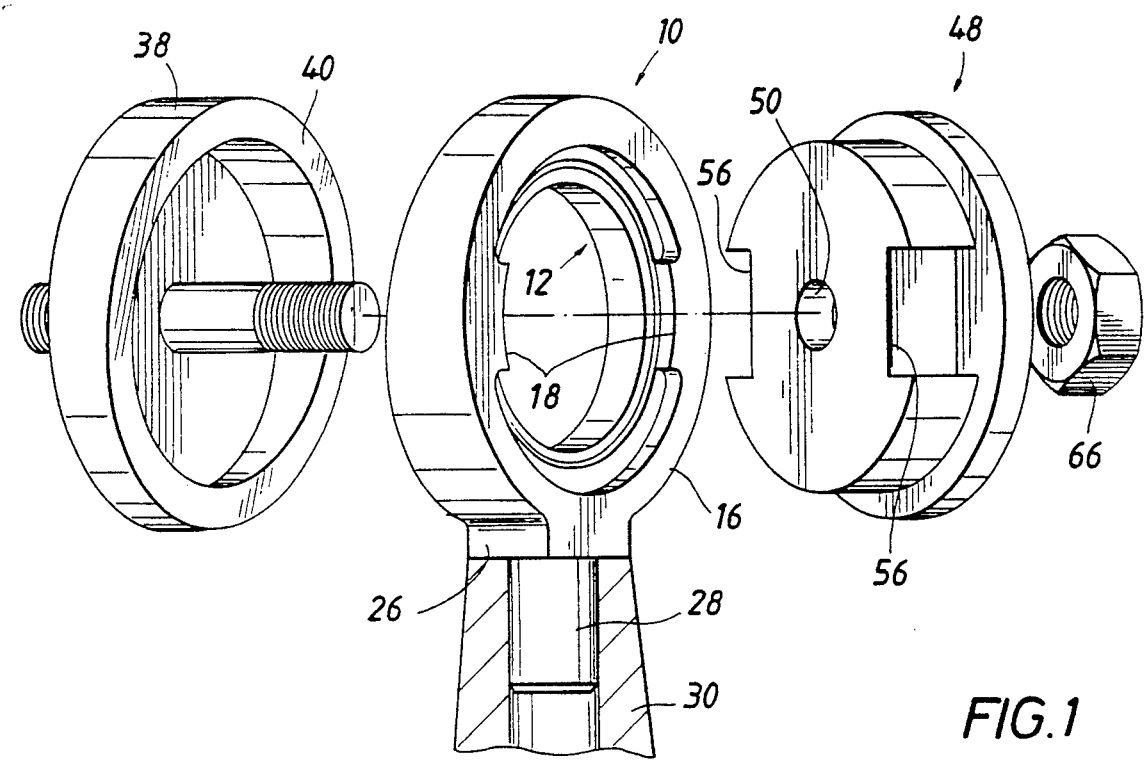
FIG. 1 is an exploded perspective view of the apparatus addressing a bearing housing from which a bearing is to removed.
Figure 3:
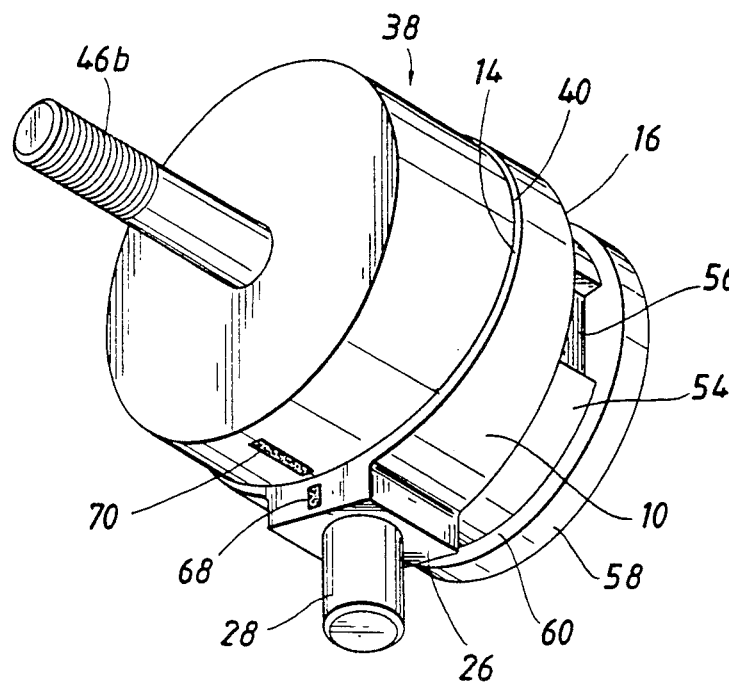
FIG. 3 is a perspective view of the assemblage of FIG. 2.

To prepare the bearing assembly 10, 12 for servicing, the shaft has been removed leaving the interior of the bearing free and open, but the bearing housing 10 has been left in situ on its support 30 in the aircraft. FIGS. 1-3 show how a tool in accord with the present invention is then applied to the bearing assembly for removal of the bearing proper 12.

The tool includes a bracing body 38 which is generally cylindrical, having a first, open end terminating in the annular axially outer surface 40 which is inclined at a corresponding angle to surface 14 of bearing housing 10. The second end of the bracing body 38 is closed by an end wall 42 whose axially outer face 44 lies perpendicular to the axis of the cylindrical bracing body 38. Surfaces 40 and 44 could be configured in any suitable manner so as to properly engage surfaces such as 14 and 16, but of bearing housings of different configurations. It is noted that, when it is said that the surfaces 40 and 44 engage respective surfaces 14 and 16, it is meant that such engagement occurs in the alternative, depending upon whether the tool is assembled for bearing removal (FIG. 2) or bearing emplacement (FIG. 4).

The tool of the invention further includes an elongate guide member in the form of a large threaded pin having first and second parts 46a and 46b, respectively. Pin 46a, 46b, in the embodiment shown, is formed monolithically with end-wall 42 of bracing body 38. However, in other embodiments, it is possible to form the pin 46a, 46b separately, and place it in a suitable hole in end wall 42, and then integrate it with wall 42 by welding, or removably secure it to wall 42, as by suitable grooves and snap rings or the like. In any event, it is preferred that the pin 46a, 46b either be integral with body 38 or connected thereto by secure means which minimize the chance of separation of the pin from the bracing body and dissemination of these parts of the apparatus.

In any case, first part 46a of the pin extends through the interior of body 38 toward and beyond its first end surface 40, whereas the second part 46b extends from and beyond the second end surface 44, both coaxially with the cylindrical bracing body 38. Each of the pin parts 46a and 46b has its outermost portion externally threaded.

The tool further includes a motive body 48 having generally circular exterior surfaces and a central aperture 50 sized for sliding receipt of either first part 46a or second part 46b of the guide member. The motive body 50 has a first end including a continuous annular face 52 lying perpendicular to its axis and a peripheral surface 54 which, but for the interruption provided by slots 56, which are sized to receive and bypass housing ears 18, is cylindrical and sized for a sliding fit in relatively small inner diameter part 22 of the bearing housing 10.

The second end of the motive body 48 has a different configuration from that of its first end, for reasons to be developed below. The second end includes an axially outermost, relatively small outer diameter part 55 sized for sliding receipt in inner race 34 of the bearing 12 and having a continuous, annular, axially outer face 56. Axially set back from face 56, the second end of the motive body 48 also includes a relatively large outer diameter part 58 sized for a sliding fit in the relatively large inner diameter part 20 of the bearing housing 10. An external axially facing shoulder 60 is formed at the juncture of large diameter part 58 of the second end and intermediate diameter part 54 of the first end of the motive body. Another shoulder, 62, facing in the opposite axial direction, is formed at the juncture of the two parts 55 and 58 of the second end of the motive body. This shoulder 62 has an annular axial recess 64 adjacent small diameter part 54.

The third and final part of the tool illustrated is a drive nut 66 adapted to be threaded onto either of the pin parts 46a or 46b, in the alternative.

To remove the bearing 12 from its housing 10, the respective first ends of the bracing body 38 and bearing housing 10 are engaged by abutting their surfaces 40 and 14, as shown in FIGS. 2 and 3. To be sure that the inclined surfaces 40 and 14 "mate," i.e. that they are arranged in complementary manner so that pin 46a, 46b lies along the axis of the bearing, indicia marks 68 and 70 are provided on the outside of the housing 10 and body 38, as shown in FIG. 3, and are visually aligned. It will be seen that, with surfaces 14 and 40 properly abutting, first part 46a of the guide pin extends through the bearing housing 10 and projects out the other side.

Motive body 48 is emplaced on first part 46a of the guide pin with its first end 54 innermost. For convenience, it is noted that the term "first" has been used for those ends of the various parts of the apparatus which are engaged or operative during a bearing removal operation, as shown in FIGS. 1-3. Motive body 48 is advanced inwardly along first part 46a of the guide pin until it slides into the smaller diameter part 22 of the bearing housing 10, and then nut 66 is threaded onto pin part 46a outwardly of and abutting motive body 48, so that the entire assemblage is retained on the bearing housing 10.

Then, the nut 66 is simply threaded inwardly along pin part 46a, forcing motive body 48 ahead of it. It is noted that the shoulder 24 in the bearing housing 10 is sized so that outer race 32 projects radially inwardly from the shoulder, and that diameter 54 of the motive body 48 is sized so that its end face 52 will overlap and abut the outer bearing race 32. Thus, face 52 abuts both the inner and outer bearing races 32 and 34, and as the drive nut 66 is moved inwardly, the entire bearing 12 will be forced out of housing 10 and into the cavity formed by the interior of cylindrical body 38. During bearing removal, shoulder 60 serves as a stop against surface 16 of the bearing housing. Thereafter, the parts are simply disassembled by removing nut 66, removing motive body 48, and withdrawing body 38, with the removed bearing therein, from the housing 10.

To install a new bearing 32', 34', 36', the bracing body is placed on the second side of housing 10 so that the perpendicular end face 44 of its second end abuts the perpendicular end face 16 of the bearing housing. Thus, second pin part 46b will extend through the bearing housing 10 and beyond its first end surface 14. The new bearing 32', 34', 36' is emplaced on the second end of the motive body 48 so as to be carried thereby, and more specifically inner race 34' is slipped over small diameter part 54 until the outer race 32' abuts the shoulder 62. It is noted that the recess 64 is sized so that shoulder 62 will clear inner race 34', as it is undesirable to apply pressure to the inner race while press fitting the outer race into the housing. Rather, the inner race 34' should be non-forcibly carried along by means of balls 36' interengaging the opposed grooves in the two bearing races.

Motive body 48 is now emplaced on second pin part 46b with its second end 55, 58 facing the housing 10, and the bearing carried by the second end of the motive body. The nut 66 is next threaded onto pin part 46b outwardly of but abutting motive body 48.

The larger inner diameter 20 of the housing 10 typically has a slight outward taper which allows outer bearing race 32' to be started into the end of the housing without the application of substantial force, so as to temporarily coaxially align the tool with the bearing housing. Thereafter, nut 66 is threaded inwardly along pin part 46b, forcing motive body 48 and the bearing carried thereby ahead of it, and thus pressing race 32' into the large diameter 20 of the bearing housing 10 until the bearing abuts the internal shoulder 24. The tool is then simply removed by removing nut 66, then motive body 48, then bracing body 48.

When the tool is not is use, the motive body 48 can be placed on either of the pin parts 46a or 46b, and retained there by threading nut 66 onto that pin part outwardly of the motive body 48. Thus, all three parts of the tool are held together so as to minimize the possibility of their dissemination and/or loss.

Certain modifications of the present invention have been suggested above, and still others will suggest themselves to those of skill in the art. By way of example only, motive body 48 has been shown as having a free sliding fit on the pin parts 46a and 46b, and a separate threaded drive nut 66 is provided. However, in other embodiments, the motive body 48 could be directly threadedly engageable with pin parts 46a and 46b. This would further reduce the number of separable parts of the apparatus. However, in some instances, the addition of a third part, i.e. nut 66, may be considered to be balanced by the relative ease with which such a nut can be engaged and rotated by a wrench, possible undesirability of relative movement between the motive body 48 and the bearing 48 in use, and the relative ease of replacing nut 66, which can be an inexpensive, even standardized part.

The use of a single reversible motive body 48, having the configurations of its two ends differing as needed to properly engage a bearing for respective removal and reinsertion procedures, is one salient feature of the invention which minimizes the necessary number of separable parts. However, in other embodiments, other salient features of the invention, e.g. the end surface of the bracing body inclined to match the inclination of the end of a special housing, or the integration of the guide pin with the bracing body, might be used with motive body means comprising two different motive bodies, one for bearing removal, and the other for bearing insertion. In such an embodiment, it is still possible to retain the motive bodies on the guide pin by one or two nuts, so as to minimize the chance of dissemination and loss thereof when the tool is not in use.

It is intended that the scope of the invention be limited only by the claims which follow.

What is claimed is:

1. Apparatus for servicing a bearing, comprising:
   a bracing body having a first end adapted to engage a first end of a housing for the bearing and a second end adapted to engage a second end of the bearing housing;
   an elongate guide member projecting endwise from the bracing body;
   a motive body removably mounted on the guide member for longitudinal movement therealong and having first and second ends of different configurations adapted to alternatively engage first and second ends, respectively, of the bearing;
   and force transmission means cooperative between the guide member and the motive body to move the motive body longitudinally along the guide member and apply a force to the bearing,
   wherein, the guide member has first and second portions adapted to project from the respective ends of the motive body, each of the portions having threads fromed thereon and the force transmission means comprises threaded drive means including threads formed on the guide member, wherein the first end of the bearing housing has a relatively large inner diameter, the second end of the bearing housing has a relatively small inner diameter, and there is an axially directed stop shoulder at the juncture of the two inner diameters of the bearing housing;
   wherein the first end of the motive body has an outer diameter small enough to fit within the second end of the bearing housing and large enough to abut an outer race of the bearing;
   and wherein the second end of the motive body comprises a small-outer-diameter, axially-outermost part, sized to fit within an inner race of the bearing, and a large-outer-diameter, axially-set-back part, sized so that a shoulder formed between the large and small outer diameter parts of the motive body will axially abut the outer race of the bearing near its outer diameter, but the large outer diameter part of the second end of the motive body will fit within the first end of the bearing housing.

2. The apparatus of claim 1 wherein the second end of the motive body has an annular recess extending axially thereinto at an inner portion of the shoulder between the large and small outer diameter parts thereof, and sized to clear the inner race of the bearing.

3. The apparatus of claim 2 wherein the first end of the bearing housing has an annular axially outer surface inclined with respect to the bearing axis, and the first end of the bracing body has a correspondingly inclined, annular, axially outer surface;
   the bearing housing and the bracing body having indicia marks to aid in mating the inclined surfaces.

4. The apparatus of claim 3 wherein the bracing body has a cavity opening axially through the inclined surface and sized to receive the bearing.

5. The apparatus of claim 3 wherein the second ends of the bearing housing and the bracing body have axially outer surfaces perpendicular to their axes.

6. The apparatus of claim 1 wherein the second end of the bearing housing has radially inwardly projecting ears;
   and wherein the first end of the motive body has radial notches to allow the first end of the motive body to bypass the ears.

7. Apparatus for servicing a bearing, comprising:
   a bracing body having a central axis for general alignment with the axis of the bearing in use, a first end having an annular, axially outer surface, inclined with respect to the axis and adapted to engage a correspondingly inclined, annular, axially outer surface of a housing for the bearing, and a second end having an axially outer surface perpendicular to the axis and adapted to engage a correspondingly perpendicular, annular, axially outer surface of the bearing housing, the bracing body and the bearing housing having indicia marks to aid in mating the inclined surfaces;
   an elongate guide member having first and second parts adapted to project endwise from the first and second ends, respectively, of the bracing body;
   motive body means alternately removably mountable on the first or second parts of the guide member for longitudinal movement therealong and engageable with the bearing;
   and force transmission means cooperative between the guide member and the motive body to move the motive body along the guide member and apply a force to the bearing.

8. The apparatus of claim 7 wherein said motive body means comprises a single motive body having first and second ends adapted to alternatively engage first and second ends, respectively, of the bearing.

9. The apparatus of claim 8 wherein the first and second ends of the motive body have different configurations.

10. A method of servicing a bearing in situ, comprising the steps of:
    removing a shaft rotatably mounted in the bearing;
    abutting a first end of a bracing member against a first end of a housing for the bearing, with an elongate guide member rigidly projecting endwise from the bracing member through the center of the bearing;
    emplacing an apertured motive body on the guide member generally on the opposite side of the bearing from the bracing member and centering a first end of the motive body within the bearing housing;
    threading a nut onto an end of the guide member projecting outwardly beyond the motive body;
    advancing the nut inwardly along the guide member, thereby urging the first end of the motive body against the bearing and pushing the bearing out of the bearing housing and into a cavity in the bracing member;

removing the nut and the motive body from the guide member;

removing the bracing body from the bearing housing;

removing the ejected bearing from the cavity in the bracing body;

placing the bracing body generally on the other side of the bearing housing, with a second end of the bracing body abutting a second end of the housing and a second part of the guide member rigidly projecting endwise from the bracing body through the center of the bearing;

placing a new bearing on a carrier portion of a second end of the motive body;

placing the motive body on the second part of the guide member with the second end thereof facing the bearing housing;

threading the nut onto the second part of the guide member axially outwardly of the motive body;

and advancing the nut inwardly along the guide member thereby urging the second end of the motive body toward the bearing housing and forcing the bearing carried thereby into the bearing housing.

* * * * *